United States Patent
Bakish

(10) Patent No.: US 7,775,113 B2
(45) Date of Patent: Aug. 17, 2010

(54) SOUND SOURCES SEPARATION AND MONITORING USING DIRECTIONAL COHERENT ELECTROMAGNETIC WAVES

(75) Inventor: Tal Bakish, Kiryat Ono (IL)

(73) Assignee: AudioZoom Ltd., Modiin (IL)

( * ) Notice: Subject to any disclaimer, the term of this patent is extended or adjusted under 35 U.S.C. 154(b) by 542 days.

(21) Appl. No.: 11/841,134

(22) Filed: Aug. 20, 2007

(65) Prior Publication Data
US 2008/0056724 A1 Mar. 6, 2008

Related U.S. Application Data

(60) Provisional application No. 60/841,574, filed on Sep. 1, 2006.

(51) Int. Cl.
*G01R 33/20* (2006.01)
*H04B 10/00* (2006.01)

(52) U.S. Cl. .............. 73/632; 73/596; 73/655; 398/130

(58) Field of Classification Search .......... 73/596, 73/632, 655; 398/130
See application file for complete search history.

(56) References Cited

U.S. PATENT DOCUMENTS 3,714,438 A * 1/1973 Hahn et al. ............. 398/182
5,175,713 A    12/1992 Ballard
6,317,237 B1   11/2001 Nakao et al.
6,517,490 B1 *  2/2003 Garlick .................. 600/459
6,590,661 B1 *  7/2003 Shnier ................... 356/432
6,702,747 B2 *  3/2004 Garlick .................. 600/459
7,073,384 B1 *  7/2006 Donskoy et al. ............ 73/657
2010/0060901 A1 * 3/2010 Martin et al. ............. 356/512

FOREIGN PATENT DOCUMENTS

GB        2142141 A   *   8/1985

OTHER PUBLICATIONS

A Sound source separaing system with the ability of automatic tone modeling. (Kunio Kashino et al.), Japan, ICMC proceedings 1993.*

* cited by examiner

*Primary Examiner*—J M Saint Surin
(74) *Attorney, Agent, or Firm*—Martin Fleit; Paul D. Bianco; Fleit Gibbons Gutman Bongini & Bianco PL

(57) ABSTRACT

An apparatus and a method that achieve physical separation of sound sources by pointing directly a beam of coherent electromagnetic waves (i.e. laser). Analyzing the physical properties of a beam reflected from the vibrations generating sound source enable the reconstruction of the sound signal generated by the sound source, eliminating the noise component added to the original sound signal. In addition, the use of multiple electromagnetic waves beams or a beam that rapidly skips from one sound source to another allows the physical separation of these sound sources. Aiming each beam to a different sound source ensures the independence of the sound signals sources and therefore provides full sources separation.

14 Claims, 6 Drawing Sheets

PRIOR ART

SOUND SOURCES SEPARATION AND MONITORING USING DIRECTIONAL COHERENT ELECTROMAGNETIC WAVES

CROSS-REFERENCE TO RELATED APPLICATIONS

This application claims the benefit under 35 U.S.C. §119 (e) of U.S. Provisional Patent Application No. US60/841,574 filed Sep. 1, 2006, the content of which is incorporated by reference herein.

FIELD OF THE INVENTION

The present invention relates to coherent electromagnetic waves and more specifically, to remote sensing of sound sources using coherent electromagnetic waves.

BACKGROUND OF THE INVENTION

Vibrometry is the technical field of measuring vibrations of an object. In remote vibrometry, the vibrations are measured from a distance (aka no-contact vibrometry). One of the common ways to achieve vibrations remote-sensing is by using coherent electromagnetic waves (usually laser) and exploiting their physical properties.

Specifically, the vibrating object acts as a transducer by modifying the properties of the electromagnetic waves that hit it, according to the vibrations, prior to reflecting back the electromagnetic waves. As any sound source generates vibrations, coherent electromagnetic waves may be used to detect and sense sound. And indeed, many attempts have been made in the art of remote sound sensing and detection using coherent electromagnetic waves.

The majority of the coherent electromagnetic-waves-based sound vibrometers available today are configured so that the coherent electromagnetic waves are not directed at the vibrating sound source. Rather, the electromagnetic waves in these sound vibrometers are directed at objects that reflect the sound waves, usually flat surfaces such as windows and walls in the proximity of the sound generating object.

For example, U.S. Pat. No. 6,317,237 which is incorporated by reference herein in its entirety discloses a system wherein a laser beam is directed at a window pane of a building and the reflecting laser beam is received and analyzed to extract the sound waves (specifically human voices) generated within the building.

U.S. Pat. No. 5,175,713 which is incorporated by reference herein in its entirety, discloses a method for under-water sound sensing using laser beams directed at reflectors and analyzing the reflected beams in order to detect and sense under-water sound propagation.

Presently available remote sensing sound vibrometers use a variety of techniques to extract the information from the reflected beam. The traditional solution comprises an interferometer that conducts interference between the reflected beam and a reference beam. Another common technique is based upon the Doppler Effect. According to this technique, since the wavelength of the reflected beam is changed in accordance with the vibrations of the vibrating object that reflects the electromagnetic waves therefore the change in wavelength correlates to certain vibrations which in turn represent a specific sound signal. Yet another technique involves the analysis of the speckle pattern. A speckle pattern is causes whenever a reflected beam of coherent light creates a spot containing a plurality of interferences. This result in a spot comprising varying intensity dotted pattern reflected from a vibrating surface. One of the ways to analyze a speckle pattern involves the use of a charge couple device (CCD) array or any other array of photosensitive cells serving as receiver units for the reflected speckle pattern, wherein digital signal processing methods help extract the sound signal.

FIG. 1 shows the general structure of a typical remote sound-sensing system according to the prior art. FIG. 1 shows a laser Doppler vibrometer 100 (LDV) which is one of the common embodiments for Doppler vibrometry. The LDV 100 transmits an outgoing laser beam 120 directed at a flat surface 140. The flat surface may be a window, a wall or a dedicated reflector that have been placed deliberately to act as sound reflector. A sound source 110 generates sound waves that hit the flat surface 140 which result in vibrations. The outgoing laser beam 120, upon hitting the flat surface 140 is reflected back to the LDV 100 wherein the properties of the reflected laser beam 130 has been modified due to the vibrations of the flat surface 140. Inside the LDV 100 the reflected beam is analyzed and compared with a reference beam (not shown) to reconstruct the sound that has been generated by the sound source.

The main drawback of currently available remote sound sensing systems is their poor ability of sound sources separation. This drawback is reflected in two manners: noise separation and blind sources separation. By relying on a beam reflected from a vibrating surface rather than directly the sound generating object, the systems according to the prior art are actually sensing the sound source's ambient, which may include noise that inherently reduces the quality of the sound sensing. In addition, by sensing a reflection from a surface, rather than the sound sources directly, the sound signal extracted actually represents the superposition of all the sound sources presented in the same close proximity. Noise filtering, as well as blind sources separation (the separation of the different unrelated sound sources) has to be performed using time-consuming and not always cost-effective digital signal processing (DSP) techniques.

It would be therefore advantageous to have an apparatus and a method that allows the physical separation of sources while monitoring the sound generated therefrom, as well as noise separation, without the use of complex DSP techniques, while retaining the high quality of remote sound sensing.

SUMMARY OF THE INVENTION

The present invention discloses an apparatus and a method that achieve physical separation of sound sources by pointing directly a beam of coherent electromagnetic waves (i.e. laser). Analyzing the physical properties of a beam reflected from the vibrations generating sound source enable the reconstruction of the sound signal generated by the sound source, eliminating the noise component added to the original sound signal. In addition, the use of multiple electromagnetic waves beams or a beam that rapidly skips from one sound source to another allows the physical separation of these sound sources. Aiming each beam to a different sound source ensures the independence of the sound signals sources and therefore provides full sources separation.

In some embodiments, the apparatus for sound source separation according to the present invention is a directional coherent electromagnetic wave based vibrometer. The vibrometer comprises a coherent electromagnetic wave beam transmitter connected to a control unit, which is connected in turn to a processing unit, which is connected in turn to a coherent electromagnetic wave beam receiver via said control unit. Upon operation, the transmitter transmits at least one coherent electromagnetic wave beam directly at least one vibrating sound source. the receiver then receives at least one coherent electromagnetic wave beam reflected directly from at least one vibrating sound source said the processing unit controls said transmitter's operation via said control unit that uses the information extracted from the reflected beam from said vibrating sound source to reconstruct the sound of said sound source whereby the sound of said sound source is being separated from other sound sources and ambient noise.

In some embodiments, a method for separating sound sources using remote sensing sound vibrometry is disclosed. The method comprises the following steps: transmitting at least one coherent electromagnetic wave beam directly at least one vibrating sound source; receiving at least one coherent electromagnetic wave beam reflected directly from at least one vibrating sound source and then analyzing information gathered from the coherent electromagnetic wave beam reflected directly from the vibrating sound source whereby the sound generated by said sound source is separated from other sound sources and ambient noise.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
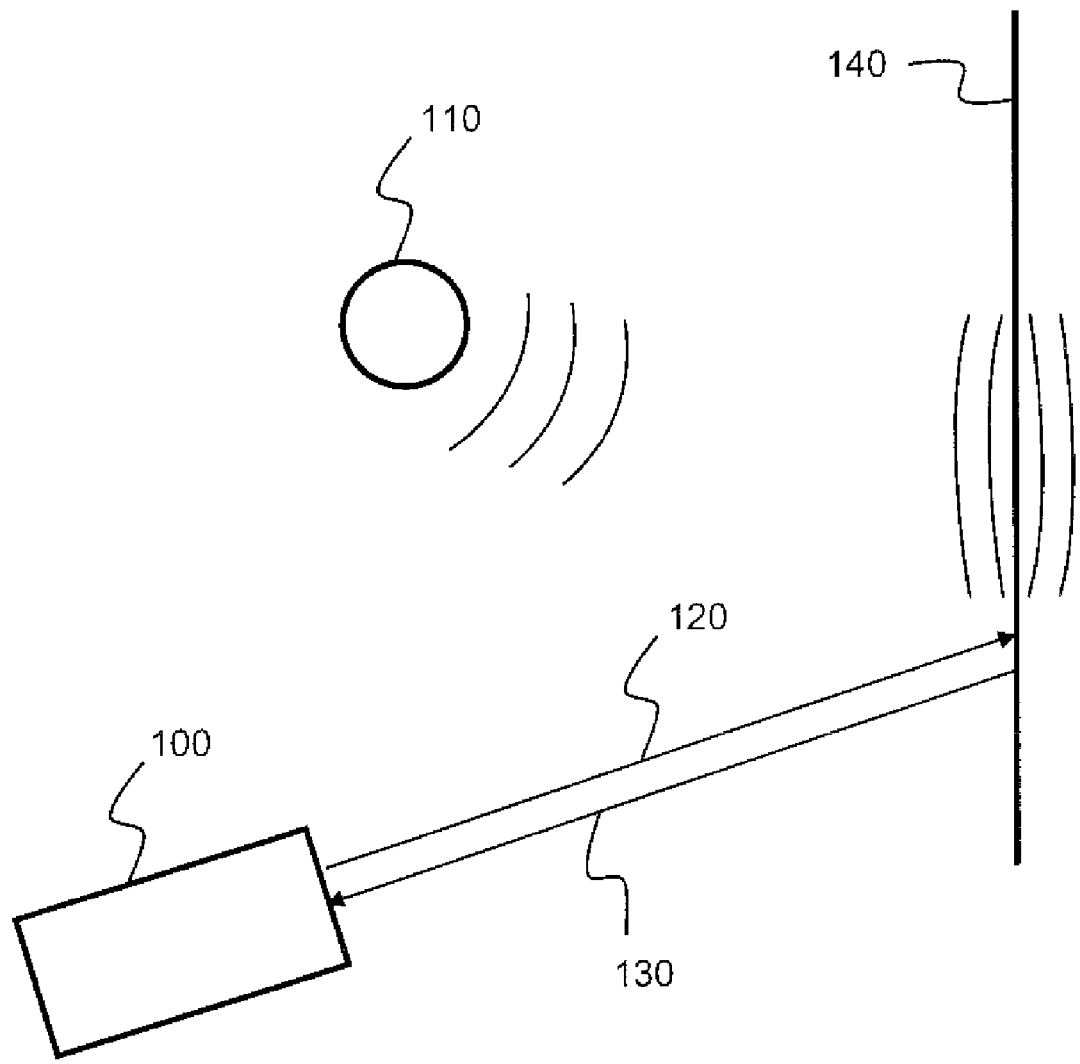
FIG. 1 is a schematic diagram showing a laser Doppler vibrometer according to the prior art.

The drawings together with the description make apparent to those skilled in the art how the invention may be embodied in practice.

Further, where considered appropriate, reference numerals may be repeated among the figures to indicate corresponding or analogous elements.

DETAILED DESCRIPTION OF THE INVENTION

Figure 2:
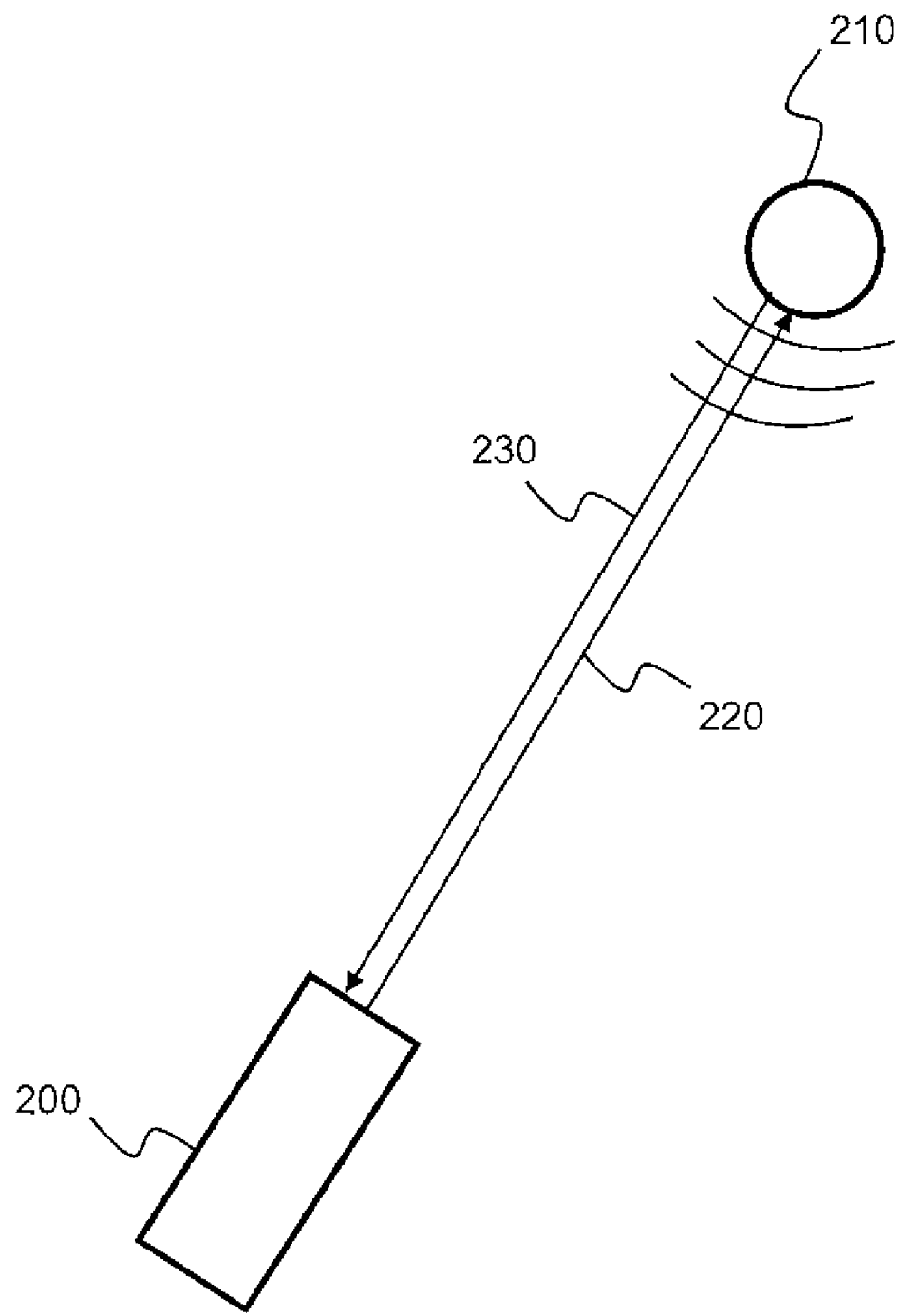
FIG. 2 is a schematic diagram showing the vibrometer according to the present invention.

FIG. 2 shows a schematic diagram of the operational environment according to the present invention. A remote sound sensing apparatus 200 generates an outgoing coherent electromagnetic waves beam 220 that is pointed directly on a vibrations generating sound source 210. Upon hitting the vibrations generating sound source 210, the outgoing coherent electromagnetic waves beam 220 is reflected and returns, with modified physical properties, as a reflected coherent electromagnetic waves beam 230, to the remote sound sensing apparatus 200. When directing the beam at the sound producing source the vast majority of the detected vibrations are related to the sound source. Since the vast majority of the sound producing vibrations related to a sound source are detected, a high degree of separation between the sound source and the ambient is thus achieved. This is due to the fact that the beam is pointed directly at the vibrations producing sound source.

According to some embodiments of the invention, the vibrations generating sound sources 210 may be human beings, wherein the vibrating object may be the skin around the face, lips and throat, but they may be any surface that is attached to the sounding board and/or source that created and/or amplifies the sound According to some embodiments of the invention, the information gathered from the reflected coherent electromagnetic waves beam 230 is extracted in more than one way. Existing techniques may be use. One technique is based on the Doppler Effect; another technique is performing a single interference; a third one is analyzing the speckle pattern—a spot containing multiple interferences.

Figure 3:
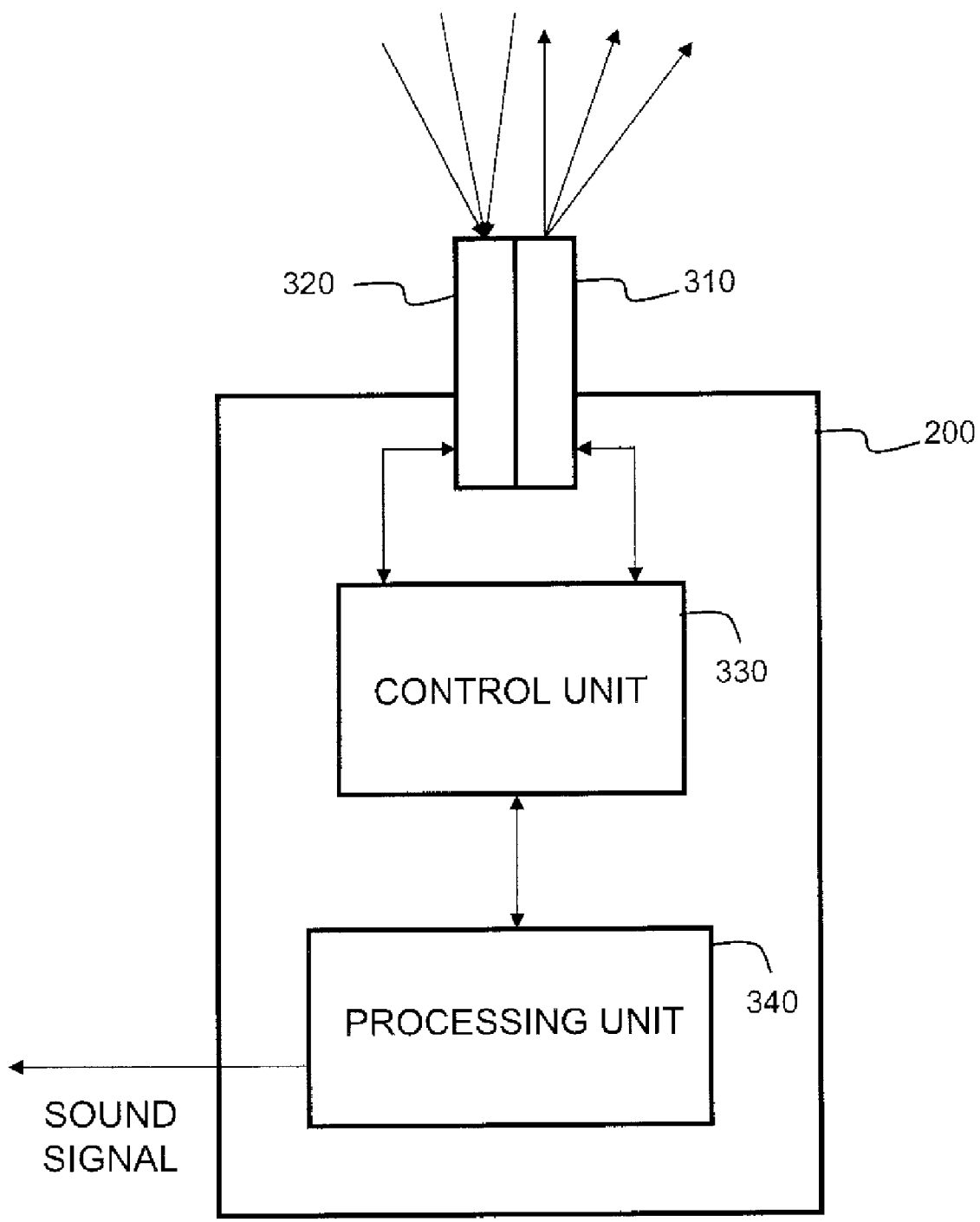
FIG. 3 is a schematic diagram showing the general structure of the vibrometer according to the present invention.

FIG. 3 shows a schematic block diagram of the structure of the remote sound sensing apparatus 200 according to some embodiments of the invention. The remote sound sensing apparatus 200 comprises a coherent electromagnetic wave beam transmitter 310 connected to a control unit 330, which is connected in turn to a processing unit, which is connected in turn to a coherent electromagnetic wave beam receiver 320 via said control unit 330. Upon operation, the transmitter 310 transmits at least one coherent electromagnetic wave beam directly on at least one vibrating sound source 210, the receiver 320 then receives at least one coherent electromagnetic wave beam reflected directly from at least one vibrating sound source 210 said the processing unit 340 controls said transmitter's operation via said control unit 330 that uses the information extracted from the reflected beam from said vibrating sound source 210 to reconstruct the sound of said sound source whereby the sound of said sound source is being separated from other sound sources and ambient noise.

According to some embodiments of the invention, each and every module of the invention may be implemented in any hardware or software form. For example, it may be implemented as an application specific integrated circuit (ASIC), as a digital signal processor (DSP), a field programmable gates array (FPGA), a software-based microprocessor or any combination thereof. Moreover, the receiver may be implemented with any array of electromagnetic sensitive cells, such as photo resistive transistors and/or diodes, built in charge coupled device (CCD) and complementary metal oxide silicon (CMOS) technologies and the like.

According to some embodiments, the Doppler Effect is used to extract the vibrations generated by the sound generating object and reconstruct the sound signals.

According to some embodiments of the invention, sound sources separation is achieved by spatial scanning of a plurality of sound sources, whereby at each time, only one beam is assigned at time to one sound source. Specifically, the apparatus according to the present invention generates a plurality of beams or alternatively, one beam that discretely scans the space according to a predefined pattern. At any specific time, a specific beam hits a specific sound source in a mutual exclusive manner and so the information gathered from this beam relates separately to the specific sound source. Thus, physical sources separation is achieved.

Figure 4:
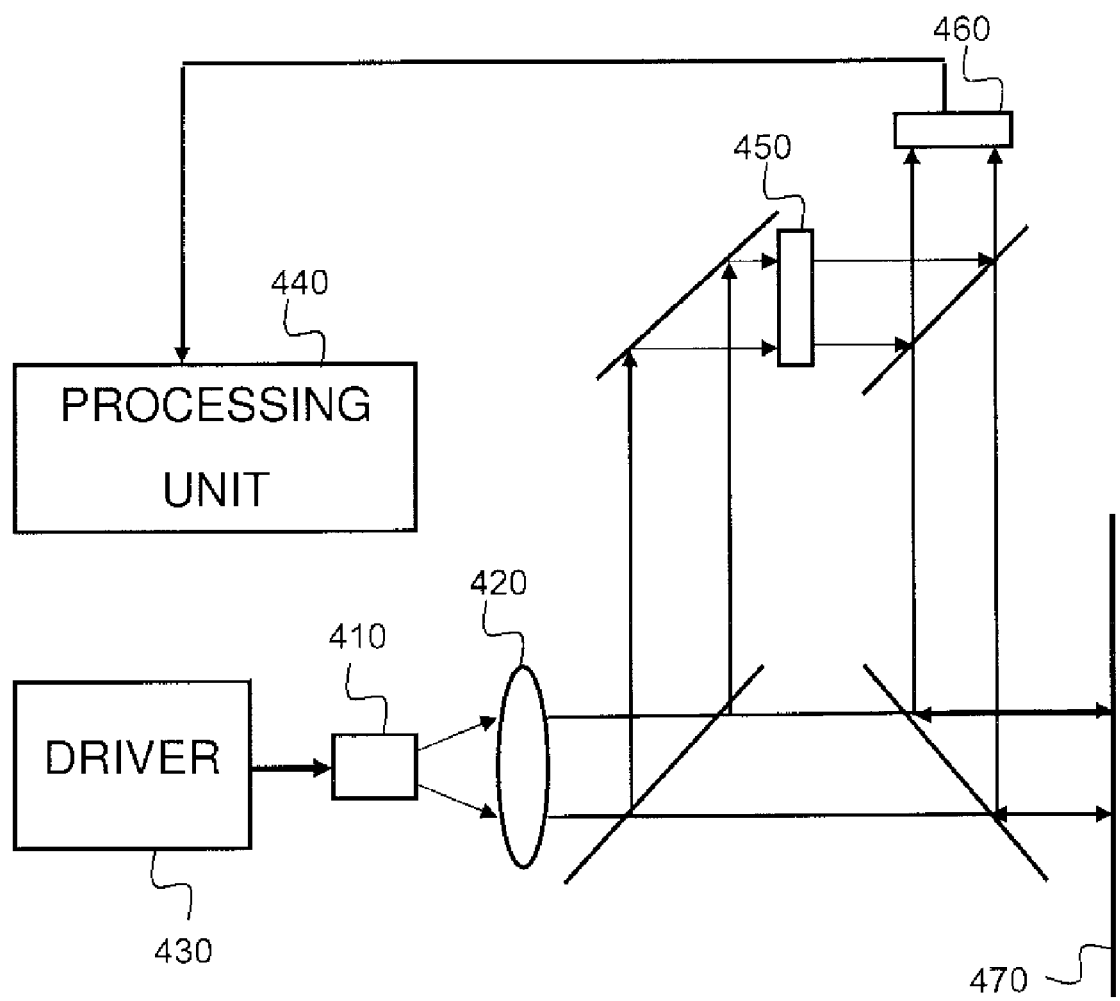
FIG. 4 is a schematic diagram showing an embodiment according to the present invention.

FIG. 4 shows an embodiment according to the invention. According to the embodiment, the vibrometer comprises a self-mixing diode 410 operated by a driver 430 and a collimating lens 420 that focuses the light and directs it on a vibrating sound source 470. The out-coming beam also passes through a modulator 450 that transfers part of the out coming beam to the photo diode 460. Additionally, the beam reflected from the sound source 470 hits a photo diode 460 that in turn transfers the signal to the processing unit 440 the reflecting beam enters the photo diode and cause instabilities that are analyzed in order to reconstruct the sound signal of the sound source.

Figure 5:
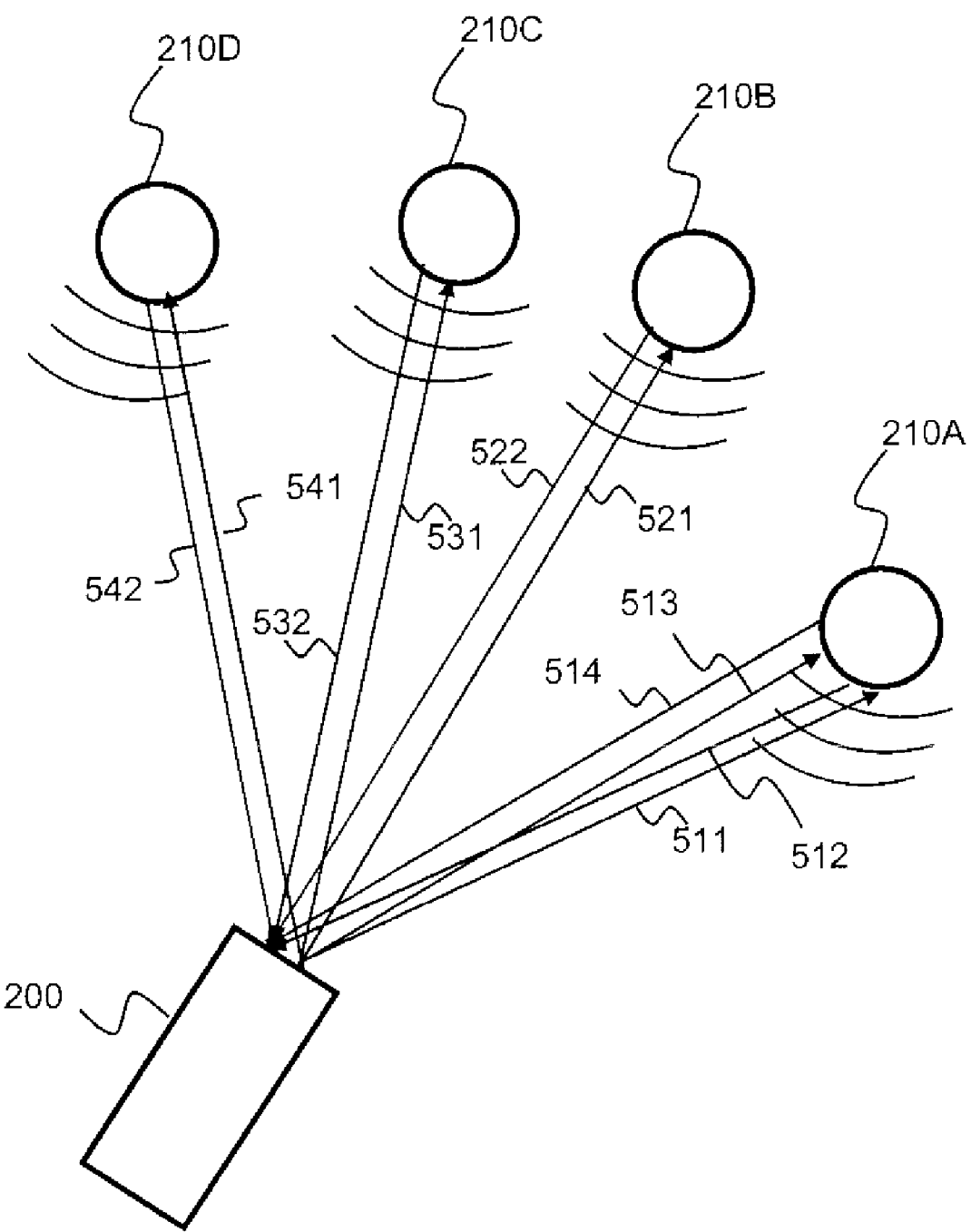
FIG. 5 is a schematic diagram showing an embodiment according to the present invention.

FIG. 5 shows the remote sound sensing apparatus 200 surrounded by a plurality of vibrating sound sources 510A-510D. The remote sound sensing apparatus 200 assigns a specific outgoing coherent electromagnetic waves beam 511, 521, 531 and 541, to each of the vibrating sound sources 210A-210D respectively. The reflected beams 512, 522, 532 may be related to each of the specific sound sources 210A-210D in a mutual exclusive manner and therefore source separation is achieved. Multi beam configuration may be is achieved either by one beam that scans the space according to a discrete predefined pattern or by using several beams simultaneously. The scanning scheme is set by the processing unit 340 and controlled by the control unit 330 according to the sound sources spatial position.

According to some embodiments, in the case of several sound sources, the vibrometer may utilize several scanning scheme that may define the size of the spatial angular step which determines the size of a 'cell' in which a sound source may be detected independently. The scanning scheme may be also determined by the scanning frequency and the amount of time the beam stays directed at each discrete step.

Figure 6:
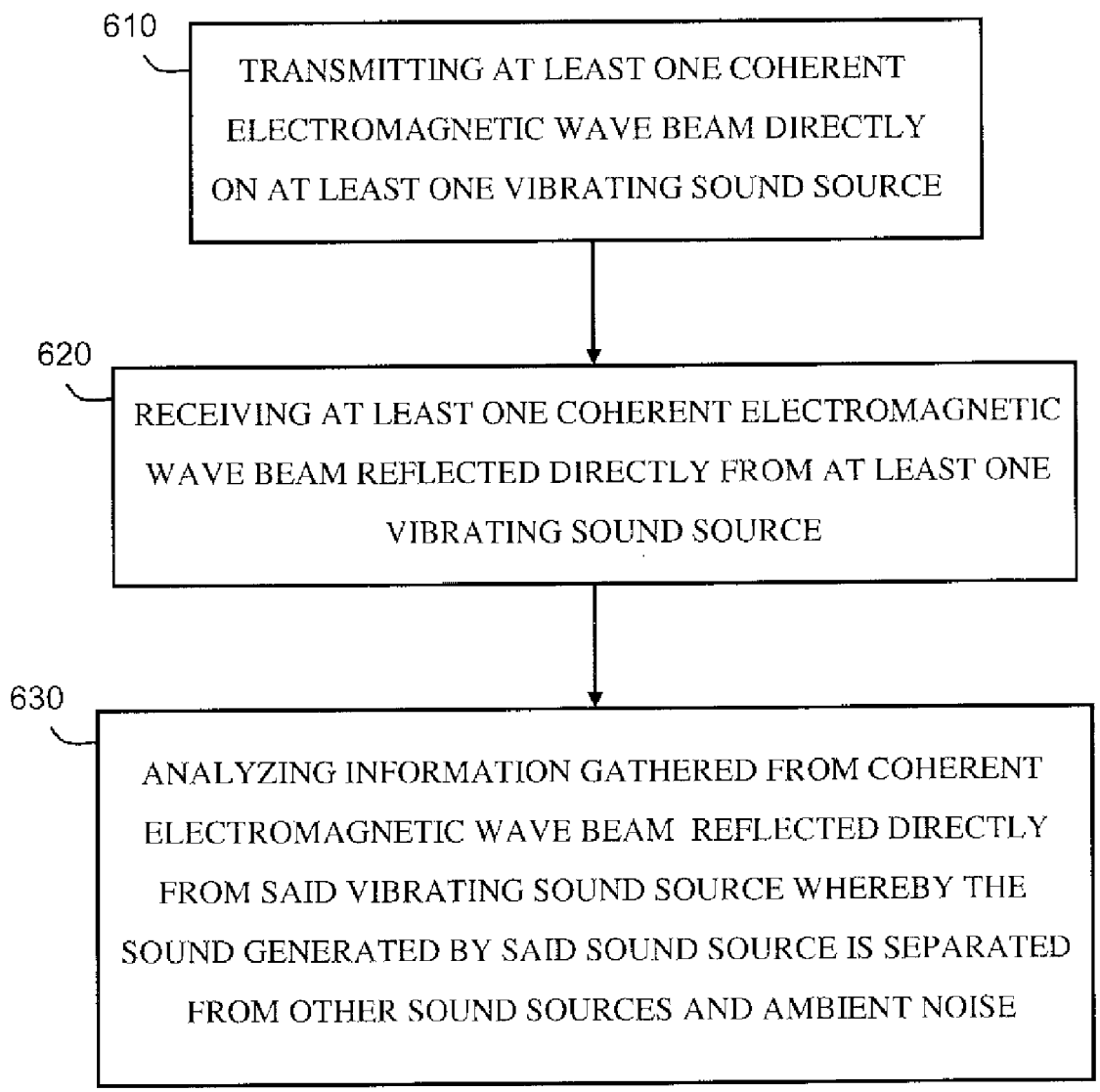
FIG. 6 is a flowchart showing the method according to the present invention.

FIG. 6 shows a flowchart describing the steps of the method disclosed according to the present invention. In block 610 at least one coherent electromagnetic wave beam is transmitted directly on at least one vibrating sound source; Then, in block 620 at least one coherent electromagnetic wave beam reflected directly from at least one vibrating sound source is received and finally, in block 630 the information gathered from the coherent electromagnetic wave beam reflected directly from the vibrating sound source is analyzed whereby the sound generated by said sound source is separated from other sound sources and ambient noise.

According to other embodiments of the invention, various DSP techniques may be used to further enhance the quality of the sound signal reconstructed from the information extracted from the reflecting beam. Specifically, these DSP techniques may be used to improve the separation of the sound source that has been greatly improved by the present invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A directional coherent electromagnetic wave based vibrometer for sound source monitoring and separation, said vibrometer comprising:

a coherent electromagnetic wave beam transmitter; connected to a control unit; connected to a processing unit; connected to a coherent electromagnetic wave beam receiver via said control unit;

wherein said transmitter transmits at least one outgoing coherent electromagnetic wave beam directly on at least one vibrating sound source;

and wherein said receiver receives at least one coherent electromagnetic wave beam reflected directly from at least one vibrating sound source;

and wherein said processing unit controls said transmitter's operation via said control unit that uses the information extracted from the reflected beam from said vibrating sound source to reconstruct the sound of said sound source whereby the sound of said sound source is being monitored and separated from other sound sources and ambient noise.

2. The vibrometer according to claim 1, wherein the coherent electromagnetic waves are laser beam.

3. The vibrometer according to claim 1, wherein the coherent electromagnetic wave beam receiver performs interference between said at least one coherent electromagnetic wave beam reflected directly from at least one vibrating sound source and at least one reference beam that is identical to at least one outgoing coherent electromagnetic wave beam.

4. The vibrometer according to claim 1, wherein the coherent electromagnetic wave beam creates multiple interferences with the outgoing beam creating a speckle pattern and wherein said speckle pattern is analyzed to reconstruct the sound signal of said sound source.

5. The vibrometer according to claim 1, wherein the coherent electromagnetic wave beam reflected from the sound source is analyzed in accordance with the Doppler Effect in order to extract the vibrations of the sound source.

6. The vibrometer according to claim 1, wherein the receiver comprises a self-mixing diode that both generates the electromagnetic beam and receives the reflected electromagnetic wave beam, and wherein the incoming beam enters the diode and cause instabilities that are analyzed in order to reconstruct the sound signal of the sound source.

7. The vibrometer according to claim 1, wherein said receiver comprises electromagnetic waves sensitive cells array implemented in at least one of the following technologies: photo resistive transistors, photo resistive diodes, charge coupled device (CCD), complementary metal oxide silicon (CMOS).

8. The vibrometer according to claim 1, wherein the processing unit is implemented by at least one of the following technologies: ASIC, DSP, FPGA, software-based microprocessor.

9. The vibrometer according to claim 1, wherein the processing unit defines a scanning pattern and wherein said scanning pattern comprise the size of the spatial angular step of the outgoing beam and the speed of scanning.

10. A method for separating sound sources using remote sensing sound vibrometry, said method comprising the steps of:

transmitting at least one coherent electromagnetic wave beam directly at least one vibrating sound source;

receiving at least one coherent electromagnetic wave beam reflected directly from at least one vibrating sound source;

analyzing information gathered from said at least one coherent electromagnetic wave beam reflected directly from said at least one vibrating sound source whereby the sound generated by said sound source is separated from other sound sources and ambient noise.

11. The method according to claim 10, wherein transmitting at least one coherent electromagnetic wave beam is done according to a scanning pattern and wherein said scanning pattern comprise the size of the spatial angular step of the outgoing beam and the speed of scanning.

12. an apparatus for separating sound sources using remote sensing sound vibrometry, said method comprising:

means for transmitting at least one coherent electromagnetic wave beam directly at least one vibrating sound source;

means for receiving at least one coherent electromagnetic wave beam reflected directly from at least one vibrating sound source; connected to means for analyzing information gathered from said at least one coherent electromagnetic wave beam reflected directly from said at least one vibrating sound source whereby the sound generated by said sound source is separated from other sound sources and ambient noise.

13. The Apparatus according to claim 12, wherein the coherent electromagnetic waves beam is laser.

14. The Apparatus according to claim 12, wherein the means for transmitting at least one coherent electromagnetic wave beam operates according to a scanning pattern and wherein said scanning pattern comprise the size of the spatial angular step of the outgoing beam and the speed of scanning.

* * * * *